Feb. 6, 1945.    R. L. LEVY    2,368,855
LANDING GEAR
Filed May 4, 1943    3 Sheets-Sheet 2
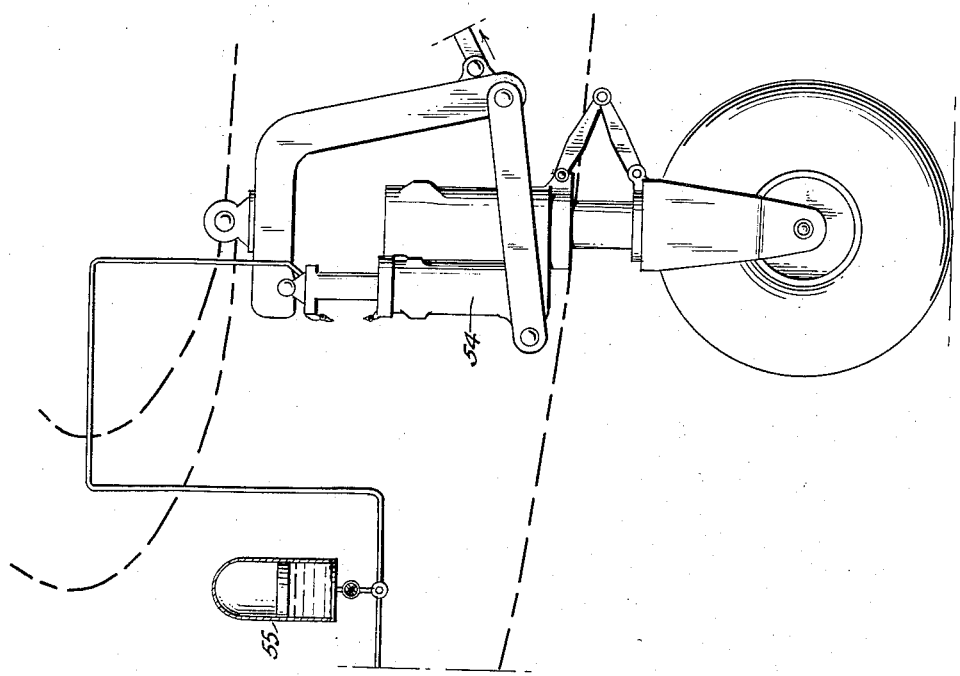
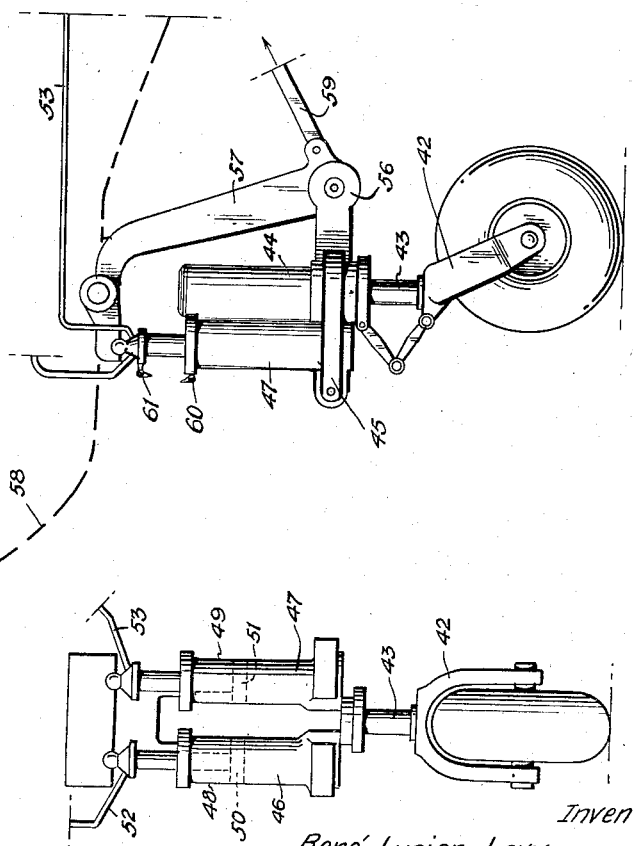
Inventor,
René Lucien Levy
By: Glascock Downing & Seebold
Attorneys.

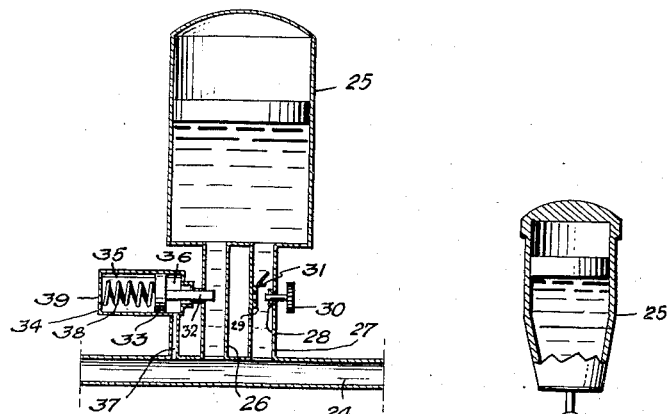
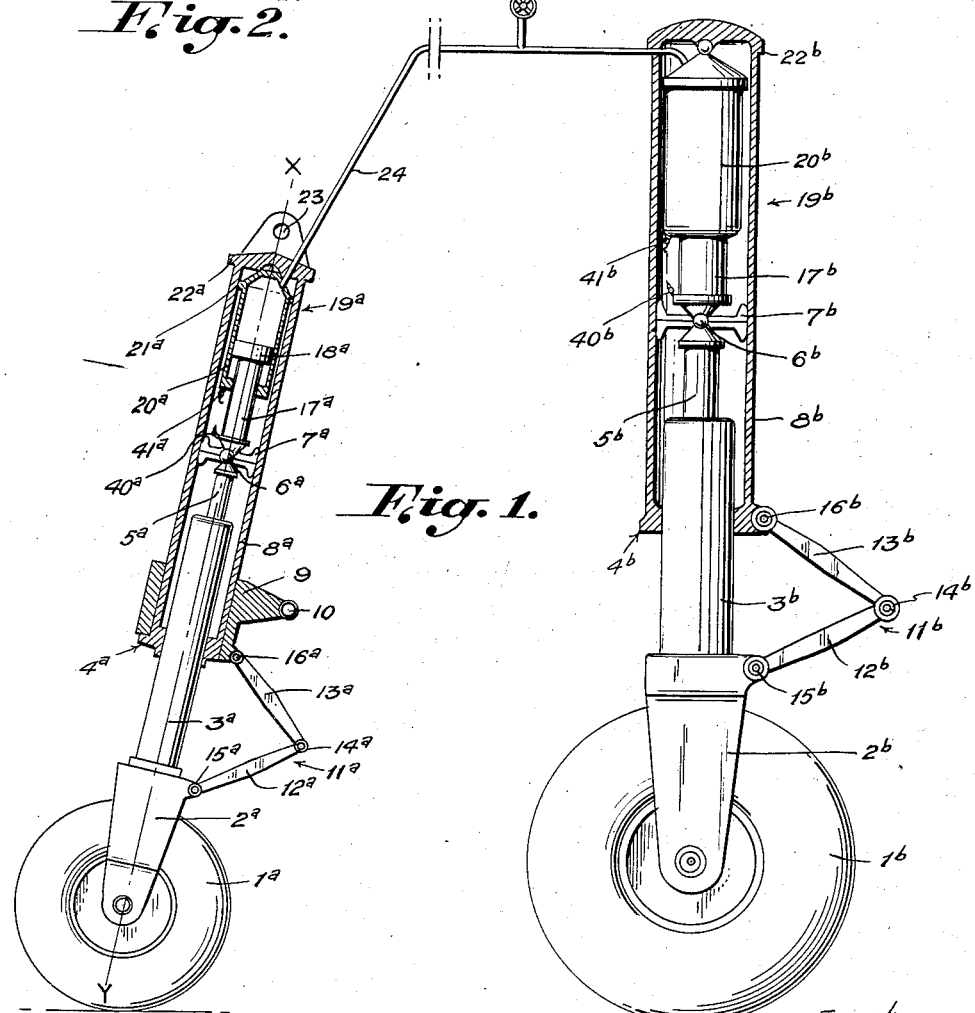

Patented Feb. 6, 1945

2,368,855

UNITED STATES PATENT OFFICE 2,368,855

LANDING GEAR

René Lucien Levy, Paris, France, assignor to Societe d'Inventions Aeronautiques et Mecaniques S. I. A. M., Geneva, Switzerland Application May 4, 1943, Serial No. 485,664
In France May 14, 1941

6 Claims. (Cl. 244—104)

It is known that the landing gear of an aeroplane has to satisfy a large number of conditions, some of which are contradictory. If one element of the gear is considered, that is the set constituted by a wheel (or two twin wheels) and the deformable structure connecting this wheel to the aeroplane, each element must, when the wheel makes contact with the ground, absorb an important amount of energy, implying a long stroke of compression with such adjustment as will ensure that throughout the stroke the instant resistance shall have the greatest possible value compatible with the solidity of the gear. Further, while taxi-ing on the ground, the element must absorb the rapid jerks caused to the wheel by obstacles on the ground, as an excessive resistance to these movements would cause alternating efforts which would constitute a cause of undue stresses to the attachments.

The present invention has for its object a landing-gear characterised by two distinct organisations affected respectively one to the contact with the ground and the other to the taxi-ing on it. This landing gear, with independent operations, complies therefore as well as possible to the multiple conditions which have to be satisfied during the landing of an aeroplane, since each organisation may be adapted perfectly to the work which it has to accomplish.

According to the invention, the contraction stroke of each element in the gear comprised two parts, of which the first is confined to the contact with the ground, that is the landing proper, and the second to taxi-ing on the ground, that is the suspension of the aeroplane.

The invention applies in particular to self-equilibrating gears, that is in which the front and rear elements of the gear are connected hydraulically in such a way that at the landing a balancing effect is produced between the two elements, thus permitting the aeroplane, no matter at what angle it may arrive on the ground, to take automatically its correct landing position.

The invention is then remarkable also that during the making of contact with the ground, the reactions which the front and rear elements receive from the ground are limited in value so long as the corresponding wheels are not together in contact with the ground. The correct position of the aeroplane in relation to the ground is therefore attained very rapidly; further the different parts of the gear are not at any moment subjected to excessive efforts.

When the wheels of the two elements are in contact with the ground, the aeroplane then being in correct position, the landing stroke is produced simultaneously in the two elements; the effort is then distributed among the different points of attachment according to the law fixed in advance.

When the landing stroke has been absorbed in totality the various parts which have participated in the stroke are immobilised in that position by a hooking device. The position of the fuselage is then as stable as with an ordinary gear. The remaining stroke for each of the elements corresponds only to the suspension, that is to say to the absorption of the shocks, due to the irregularities of the surface of the ground.

The application of the invention to self-equilibrating gears presents another important advantage; for these gears the landing or absorbing stroke is particularly long in order to permit an effective balancing, which, up to the present, has rendered their subsequent raising or retraction very difficult. The elements of the train, according to the invention, after landing, being secured at the end of the landing stroke, their length for taxi-ing is considerably reduced and rendered equal to the elements of an ordinary gear. After the aeroplane has taken off, the retraction of the gear is therefore as easy as that which applies to a gear of current type. For landing, the gear is first liberated, then the parts which participate in the landing stroke are freed by any convenient means and assume their extended position favorable to a good balancing and to the absorption of the landing shocks.

The invention has for its object, in particular, a self-equilibrating gear of the tricycle or quadricycle type. In a gear of the quadricycle type the hydraulic transmissions for the balancing are interposed between the front and rear elements affecting the same side of the aeroplane. In a gear of tricycle type the deformable structure connecting the front wheel with the aeroplane consists of two parts playing together the same roles, connected respectively to the rear left element of the gear, and to the rear right element, so that the equal distribution of liquid, necessary for a correct balancing between each of the parts and the rear corresponding elements, shall be effected.

In the following description, made by way of example, reference is made to the attached diagrammatic drawings, in which:

Fig. 1 is a side view, with parts in section, of a quadricycle landing gear comprising a front element and a rear corresponding element, with hydraulic connection interposed between them;

Fig. 2 is a detailed view on larger scale;

Fig. 3 is a side view of the front and rear element of a tricycle gear;

Fig. 4 is a front view of the front element;

Figure 5:
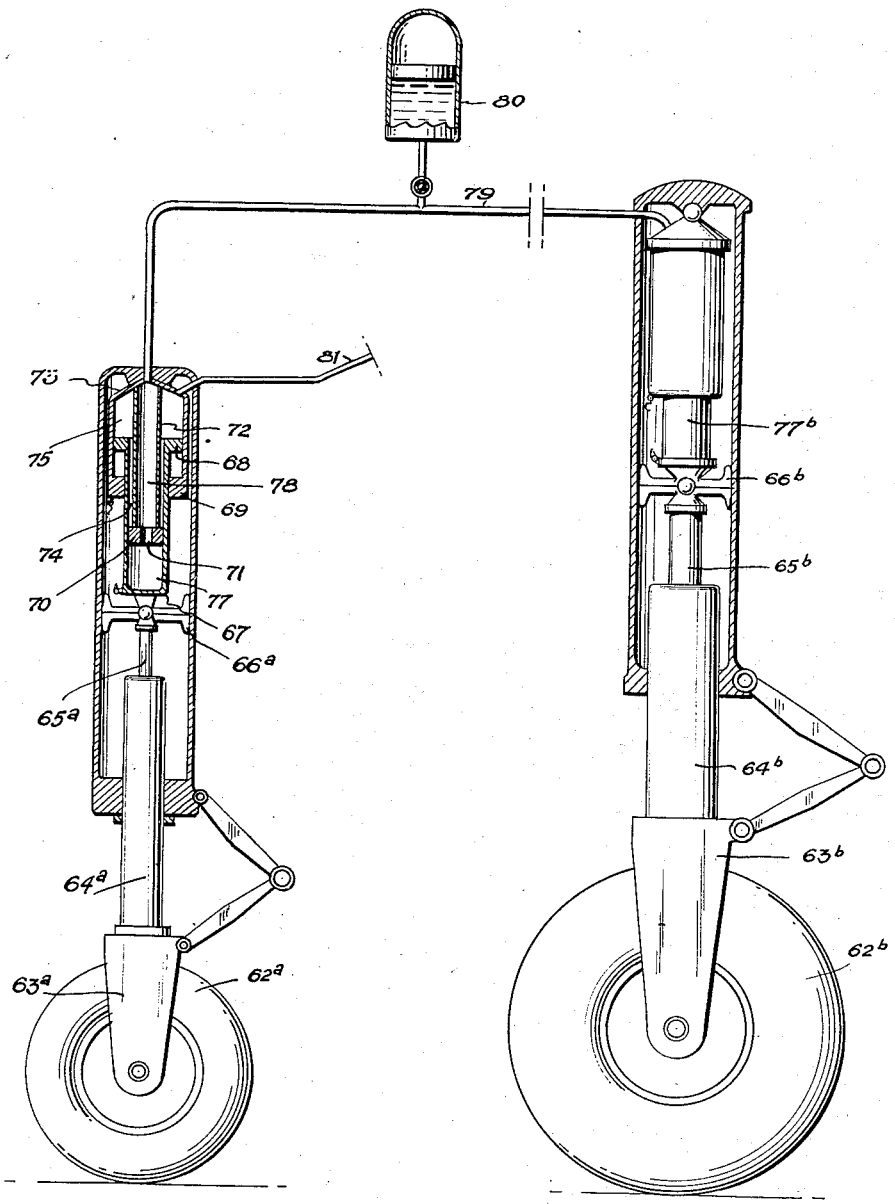
Fig. 5 is a side view, with parts in section, of the front and rear elements of a tricycle gear, for a modification.

Referring to Figs. 1 and 2, the front wheel 1, which, for example, is the front left wheel of a quadricycle gear, is mounted at the extremity of a fork 2. This is integral with cylinder 3 of a shock absorber 4 adapted to the suspension and of which the piston rod 5 is mounted by a swivel 6 in a guiding piston 7. This guiding piston is slidably mounted in a guiding cylinder 8 which is integral with a collar 9 on which are mounted, at 10, the parts which control the steering of wheel 1. A device 11, composed of two arms 12 and 13 hinged one on the other at 14 and also at their other extremities respectively at 15 on the fork 2 and at 16 on collar 9, prevents any rotation of the wheel 1 around axis X—Y of the guiding cylinder 8 other than that controlled by the intermediary of collar 9. On the side of the guiding piston 7 opposite to that on which is mounted the shaft 5, is placed, also through a rotula, rod 17 of piston 18 forming part of a jack 19 of which the cylinder is shown at 20. This cylinder is fixed, at 21, on the end 22 of guiding cylinder 8 which is connected at 23 with the fuselage of the aeroplane. The constitution of the rear element of the landing gear corresponding to the front element, which in the present case is the rear left element, is absolutely similar to that described, except that no steering device is provided, as the rear wheel is not used in steering. The parts of the front wheel are referred to with the index $a$, and the corresponding parts for the rear wheel have the same references but with index $b$.

The cylinders $20^a$ and $20^b$ are connected by a pipe 24. This pipe communicates with a hydropneumatic accumulator 25 by the intermediary of two pipes 26 and 27.

In pipe 27 is a regulating diaphragm 28, constituted, by example, by a ring 29 of which the orifice may be modified at will by a regulating screw 30 mounted on pipe 27 and of which the extremity is situated in the said orifice. On ring 29 is hinged a valve 31 with a calibrated orifice, and rising on the passage of liquid in the direction from pipe 24 to accumulator 25. The pipe 26 may be closed by the end of a piston rod 32, part of a piston 33, mounted in a small cylinder 34; piston 33 limits in the said cylinder two chambers 35 and 36. Chamber 36 is in communication with pipe 24 by tube 37. In the chamber 35 is placed a spring 38 supported, at one end, by the bottom 39 of cylinder 34, and at the other end on piston 33. The shaft of piston 17 carries a hook 40 and cylinder 20 carries a corresponding part 41. These hooking parts 40 and 41 are such that when part 40 comes in contact with part 41 the hooking together is produced automatically. The separation is effected at will by the pilot through electric, mechanic, hydraulic, or other means.

The constitution of the front and rear right elements of the landing gear is identical with that which has been described for the front and rear left elements.

The operations are as follows:

If during landing the rear wheels, or one of them, touch the ground first, the set formed by rear wheel $1^b$, absorber $4^b$, guiding piston $7^b$, and piston $18^b$, is contracted, the piston $18^b$ sending the liquid in cylinder $20^b$ towards pipe 24. The passage of the liquid from pipe 24 to accumulator 25 causes a braking in the circulation, but very slight by reason of the dimension of diaphragm 28.

When, in consequence of the compression of the rear wheel, the front wheel makes contact with the ground, piston $18^b$ also pushes liquid into pipe 24. Wheels $1^a$ and $1^b$ being together in contact with the ground, the fuselage of the aeroplane is steadied by the balancing between the front and rear wheels. The wheel which touches the ground first plays also, in a way, the role of a compression element.

It is to be remarked that when the two wheels are in contact with the ground, the output of liquid through passage-way 24 and pipe 27 is much more important, and the braking by passage in diaphragm 28 is energetic. The total compression of jacks $19^a$ and $19^b$ is effected, and the shock of landing is absorbed. Pistons $18^a$ and $18^b$ are then at the end of their strokes in their cylinders $20^a$ and $20^b$, and rods $17^a$ and $17^b$ are locked in their extreme upper positions owing to hooking devices 40 and 41. The landing gear then operates ordinarily through absorbers $3^a$ and $3^b$ which take up the shocks due to the inequalities of the ground.

If, in the course of landing, the pressure in pipe 24 attains a predetermined value, the liquid pushes piston 33 which then opens the trap 32, thus preventing the pressure from mounting above the said value.

Accumulator 25 is at a pressure exactly sufficient to ensure the lowering of the front and rear corresponding landing elements, and no more.

During taking off, piston rods 17 and $17^a$ remain locked so that the lifting of the gear is easy, the gear having the ordinary length. Just before landing, pistons $17^a$ and $17^b$ are liberated by unhooking parts 40 and 41, and the front and rear elements take up their position proper for contact with the ground.

The invention applies also to landing gear for the tricycle type. In this case the invention provides for the organisation of the front element so that when that element is contracted the liquid pushed arrives at the two rear elements in strictly equal quantities so that the conditions of correct balancing may be realised.

To this end, according to the invention, the front element has two twin jacks which operate in identically the same way during the landing, and communicate, respectively, one with the jack of the rear left element, the other with the jack of the rear right element.

An embodiment of a tricycle gear in conformity with the invention, is shown diagrammatically on Figs. 3 and 4. In this embodiment the front fork 42 is carried by shaft 43 of an absorber 44 corresponding to the taxi-ing of the aeroplane on the ground. The body of this absorber is rendered solid, in its vertical displacements, by means of a collar 45, with cylinders 46 and 47 of twin jacks 48 and 49 of which the pistons are shown at 50 and 51, and of which the internal chambers are in communication, respectively, by pipes 52 and 53, with the chambers of the jacks affected, respectively, to the rear right element and rear left.

The jack 54 of the rear left element is thus in communication with jack 49. A hydro-pneumatic accumulator 55 is placed on pipe 53. The jacks 46 and 47 are connected by a frame to a post 57 mounted on the fuselage 58 and receiving with knuckle joint (rotule) the extremity of the piston rods of the jacks. On the lever 57 is attached a traction bar 59 for lifting. The organisation for each of the rear elements is similar. The jacks stop automatically in extreme position owing to the hooking device of which those corresponding to jack 49 are shown in 60 and 61. The disposition of the absorber laterally to the jack acting as dash pot corresponds to the solution described in French Patent 852,208 in the name of "Société d'Inventions Aéronautiques et Mécaniques S. I. A. M.," dated October 6, 1938, for "Organisation of front wheel for aeroplanes."

The operation of this tricycle gear during landing and taxi-ing is absolutely similar to that indicated for the quadricycle gear.

On Fig. 5 is shown a modification of a tricycle gear. In this modification front wheel 62 is shown on a fork 63 fixed to an absorber 64 of which the rod 65 is mounted with knuckle joint 66. On the other side of the piston is mounted, also with knuckle joint, a hollow piston rod 67 of which the piston 68 is movable in a cylinder 69. In hollow rod 67 is mounted piston 70, pierced with a central hole 71 and of which the rod 72, also hollow, is fixed on the bottom 73 of cylinder 69. The annular space 74 situated between the two rods of pistons 67 and 72 is in communication with the upper chamber 75 of cylinder 69. The jack thus constituted includes therefore two chambers, one formed by the lower chamber 77 of the hollow rod 67 and by the interior space 78 of hollow rod 72, and the other formed by the upper chamber 75 of cylinder 69 and by the interval 74. The diameter of the pistons, the piston rods, and cylinders are such that these two chambers are subjected to the same variations of volume during the contraction of the front element of the tricycle gear. The first chamber is connected to the jack of a rear element of the gear, for example, the rear left element, by pipe 79 on which is mounted a hydro-pneumatic accumulator 80. The second chamber is connected to the jack of the other rear element, by pipe 81, a hydro-pneumatic accumulator being also provided on the said pipe. The jacks of the rear elements are, in the most simple way, of the type shown on Fig. 1. The hooking device of the jacks are identical with those which have been described for the former embodiment.

The operation of this embodiment of the tricycle gear is absolutely similar to the preceding, the balancing between the two rear elements and the front element of the gear remaining correct in all cases owing to the equality in the quantities of liquid transferred, during landing, between the front element on one hand and the rear elements on the other hand.

What I claim as my invention and desire to secure by Letters Patent is:

1. Landing gear for an aeroplane comprising a front elastically compressive strut in which the compression stroke is in two phases, a rear elastically compressive strut similar to the one in front, a hydraulic accumulator, and passageways placing the accumulator in communication with the struts and the struts with one another, manually controlled means for restricting the flow of liquid from either one of the struts to the accumulator, and a pressure operated valve cooperating with the passage-ways to control the return of liquid from the struts to the accumutlator, said valve being responsive to pressure in the passage-ways between the accumulator and struts.

2. Landing gear for an aeroplane comprising a cylinder adapted to be connected to the fuselage of an aeroplane, a piston in the cylinder guided thereby, a shock absorber operatively connected to the piston and arranged at one side thereof, a landing wheel carried by the shock absorber, a second piston connected to the first mentioned piston and arranged at the opposite side thereof, a second cylinder in the first mentioned cylinder and into which the second mentioned piston extends, a hydraulic accumulator, and means placing the accumulator in communication with the second cylinder.

3. Landing gear as claimed in claim 2, in which the last mentioned means includes a pressure operated valve responsive to pressure in the second cylinder to allow greater flow of liquid from the second cylinder to the accumulator when the pressure exceeds a predetermined degree.

4. Landing gear as claimed in claim 2, in which a steering sleeve is rotatably mounted on the first mentioned cylinder and links connect the sleeve with the shock absorber.

5. Landing gear for an aeroplane comprising a front wheel and a pair of rear wheels, a shock absorber supported by the front wheel, a pair of cylinders rigidly secured to a stationary portion of the shock absorber, pistons slidably mounted in the cylinders, accumulators, a shock absorber carried by each of the rear wheels, a cylinder connected to each one of the last mentioned shock absorbers, pistons slidably mounted in the last mentioned cylinders, and passage-ways connecting each accumulator with one of the first mentioned and one of the last mentioned cylinders.

6. Landing gear for an aeroplane comprising a wheel supported shock absorber, an outer cylinder, a piston slidably mounted in said cylinder and operatively connected to the shock absorber, an inner cylinder in the outer cylinder, an annular piston slidably mounted in the inner cylinder and having a hollow piston rod extending through one end of the inner cylinder and connected to the first mentioned piston, a tube fixed to the opposite end of the inner cylinder and extending into said hollow rod, an apertured piston fixed to the tube and cooperating with the hollow rod to provide a pressure chamber, an accumulator, a passage-way placing the accumulator in communication with the hollow rod, and another passage-way adapted to place the inner cylinder at one side of the annular piston in communication with a similar device.

RENÉ LUCIEN LEVY.